Patented Aug. 17, 1943

2,327,166

UNITED STATES PATENT OFFICE 2,327,166

PRODUCTION OF TITANIUM SULPHATE

L'Roche G. Bousquet, Baldwin, and Maxwell J. Brooks, New York, N. Y., assignors to General Chemical Company, New York, N. Y., a corporation of New York No Drawing. Application March 29, 1940, Serial No. 326,669

2 Claims. (Cl. 23—117)

This invention relates to improvements in processes for manufacture of titanium oxide pigments.

Customary commercial procedure for making titanium oxide pigments, for example from titanium sulphate solutions, involves several well-defined stages. In the first, titaniferous raw material such as ilmenite ore is digested with sulphuric acid to form a solid mass containing titanium sulphate, ferrous and ferric sulphates, and variable amounts of unattacked ore and gangue. The digest cake is water treated to form so-called crude titanium sulphate solution comprising titanium sulphate and ferrous and ferric sulphates in solution, and undissolved solids in suspension. Metallic iron is usually added to reduce ferric sulphate to ferrous. The second stage comprises a clarification procedure, purpose of which is to separate the titanium sulphate liquor from unreacted ore, gangue and difficultly removable slimes. While attempts have been made to clarify these crude solutions by filtration, because of operating difficulties and high maintenance costs, adopted commercial practice is to separate solids and slimes by settling and decantation. Accordingly, in standard operations, crude titanium sulphate solution having solids and slimes in suspension is run into a large settling vat, treated with coagulant, settled for long periods over several days, and resultant supernatant relatively clear titanium sulphate solution is drawn off. It has been proposed to dilute the sludge-like residue, and resettle to improve recovery of water soluble titanium sulphate. Regardless of how the crude titanium sulphate solution is clarified to recover water soluble titanium sulphate, whether by single or multiple settling operation, by filtration or otherwise, there remains a residue comprising a relatively thick sludge or a filter cake containing a relatively large amount of titanium, some in water soluble form, but mostly as ilmenite ore which has remained unattacked or only partially attacked by sulphuric acid in the initial ilmenite-sulphuric acid digestion operation. For convenience, such residues are referred to generally herein as clarification residues.

Recovery of titanium from clarification residues has presented a real problem in the titanium pigment industry. Where unground ilmenite ore is used in the initial digestion stage, rehandling of the coarse titanium constituents of clarification residues to prepare the same for redigestion has presented no special difficulties, and hence and advantage has been claimed for use of unground ilmenite in the initial ilmenite-sulphuric acid digest. However, general trend of the industry has been toward digestion of finely ground ilmenite ore because greater overall efficiencies are obtained in spite of present practical necessity for discarding clarification residues with resulting waste of material containing of the order of 60% TiO₂ mixed with solid impurities largely of siliceous nature.

Suggestions have been made regarding recovery of titanium values from clarification residues produced in operations in which ground ilmenite is used. For example, it has been proposed to incorporate some of such residue with the ilmenite-sulphuric acid mass of the digestion stage. Also, it has been suggested to treat a quantity of residue with a very large excess of sulphuric acid, e. g. the full amount of acid to be used in a major digest operation, and then add to the resulting very high acidity factor mass whatever amount of raw ilmenite is to be employed in the digest operation. While by methods of this type some of the titanium contained in the residues may be converted to water soluble sulphate and recovered, such procedures involve certain operating objections. In practice, the crude titanium sulphate liquor obtained by water solution of the residue-ilmenite-sulphuric acid digest cake contains such a continuously increasing proportion of insoluble matter that subsequent clarification by settling is substantially impeded. Also, residue redigestion in this general way involves a building up in the circuit of undesirable impurities. Further, accumulation of sulphuric acid insoluble matter and deleterious impurities takes place to such degree that at the third and fourth recycling of clarification residue, it is necessary to discard all of the solid residue of the clarification stage notwithstanding the fact the residue is still high in titanium values. These operating objections, which practically offset the value of any increased TiO₂ recovery, apply to a greater or lesser extent to prior methods proposing recovery of titanium from clarification residues by procedure including recycling of clarification residues into the initial ilmenite-sulphuric acid digestion stage.

The present invention particularly aims to provide methods the practice of which afford high recovery and conversion to water soluble form of titanium values of titaniferous materials, for example such as residues resulting from the settling of crude titanium sulphate solution containing solid titanium material undigested by previous sulphuric acid attack, and the subsequent separation of the solution from the bulk of the solid material. Another purpose of this invention is to provide methods so that the titanium values may be recovered in form of basic crystalloidal titanium sulphate solutions adaptable for use in customary hydrolysis operations.

The invention and the objects and advantages thereof may be more fully understood from the following discussion and examples.

In practice of the invention raw titaniferous material such as ilmenite is digested with sulphuric acid in accordance with any suitable prior art method. The digest cake is treated with water to dissolve water soluble salts including titanium sulphate, and usually metallic iron is added to reduce ferric sulphate to ferrous. This crude titanium sulphate solution containing all unattacked solid material in suspension is run into a settling vat, and treated with enough water solution of glue to promote coagulation of slimes. The mass is settled for say 24–72 hours, after which partially clarified supernatant titanium sulphate solution is decanted off and run into a collecting tank. In good plant practice, the decanted titanium sulphate solution comprises around 85% of the total liquid of the mass in the settling vat. The decanted liquor ordinarily contains a small amount, e. g. 2–5 g. p. l., of solids in suspension, and is customarily filtered to form a brilliantly clear titanium sulphate solution containing only a trace of suspended solids. The filtrate, having a factor of acidity of e. g. 50–90%, is run to storage and constitutes a stock titanium sulphate solution which is subsequently hydrolyzed to produce crude metatitanic acid. Up to this point procedure is in accordance with accepted practice.

The sludge-like residue left in the bottom of the settling vat, after decantation of the relatively clear supernatant titanium sulphate solution, is an example of materials to treatment of which the present invention is directed. The physical and chemical nature of these residues vary so widely, on account of differing methods by which ilmenite and sulphuric acid may be digested, that it is not possible to comprehensively state compositions of residues of this kind. Generally speaking, the sludge-like mass has a high solid matter content which in most cases averages around 60% $TiO_2$, and further comprises appreciable quantity of water soluble titanium sulphate more or less closely bound up with solid material, some ferrous sulphate, and aqueous solution of sulphuric acid. On basis of present development of the titanium pigment industry, most advantageous use of the method of the invention is for recovery of titanium values from customary settled sludge residues described above and formed in large quantities in practice. However, the present improvements are equally applicable to recovery of titanium values from filter cakes produced by filtration of crude titanium sulphate solutions; filter cakes resulting from filtration of decanted settling vat liquors as described above; discolored and impure $TiO_2$ such as that collecting in the dust chamber following the calcination stage of a titanium pigment plant; crude metatitanic acid such as that obtained in cases where in plant practice, a titanium sulphate solution, which for some reason or other is unsuitable for hydrolysis in the regular plant procedure, is hydrolyzed as by boiling to recover contained $TiO_2$ as crude metatitanic acid precipitate; and from all generally similar titaniferous materials which have been previously processed in some way or other.

The problem presented is first to provide method affording sufficiently high recovery of titanium to make treatment of these residues economically feasible. Very briefly, we accomplish this end by incorporating with the residue certain quantities of sulphuric acid, and baking the mass under certain temperature conditions to produce a baked cake of high water soluble titanium content. The baked cake is then water treated to dissolve titanium sulphate and form a titanium sulphate solution. It is noted that in customary commercial scale operations, stock titanium sulphate solutions are basic, i. e. have acidity factor less than 100%, and are often held in storage for substantial time intervals prior to use in hydrolysis step. Hence, a satisfactory basic stock solution should be crystalloidal and contain no colloidal titanium the presence of which induces hydrolysis. Otherwise the stock solution prematurely hydrolyzes while in storage and becomes of little practical value. Hence, a second requirement presented in effecting titanium recovery from residues is provision of a method such that the titanium may be ultimately recovered in the form of a crystalloidal basic titanium sulphate which may be stored without premature hydrolysis and which may be hydrolyzed in accordance with accepted practice or may be combined with stock titanium sulphate solutions in the storage tanks prior to usual hydrolysis of the composite liquor.

In connection with crystalloidal titanium salt solutions, it is noted the crystalloidal state of titanium salt solutions is characterized by absence of colloidal titanium compound. A satisfactory test for absence of colloidal titanium is that which shows the absence of coagulated titanium when a sample of the solution to be tested is treated with an equal volume of concentrated (35–37%) hydrochloric acid. In practice of this test, any colloidal titanium in the sample is coagulated immediately on addition of hydrochloric acid. Should colloidal titanium content of the sample be substantial, coagulated material though suspended and unsettled is readily visible to the naked eye. If no coagulated material is visible the hydrochloric acid treated sample may be settled for a substantial period of time and filtered or centrifuged in a high-speed centrifuge. If analysis of the filtrate or of the centrifuged liquor shows the same total titanium (calculated as $TiO_2$) content by weight as did the sample prior to hydrochloric acid dilution, the sample tested contained no colloidal titanium. If analysis of the filtrate or of the centrifuge liquor shows appreciably less total titanium than that of the sample prior to hydrochloric acid dilution, it will be evident the sample contained colloidal titanium in amount corresponding with the total titanium deficiency of the filtrate or centrifuge effluent subjected to analysis.

With regard to "acidity factor," it is noted as known in the art relating to production and use of titanium sulphate solutions, percent acidity factor (represented by F. A.) of a titanium sulphate solution is the ratio (multiplied by 100 of so-called free $H_2SO_4$, (i. e., acid not combined with bases or with titanium as $TiOSO_4$) and the titanium equivalent acid based on $TiOSO_4$, (i. e., the acid constituent of $TiOSO_4$ as such). Free acid plus acid combined with titanium to form $TiOSO_4$ as such is designated "active acid." In terminology of the art, zero F. A. represents a condition in which all titanium in solution is present as titanyl sulphate (TiOSO₄), and 100% F. A. represents a condition in which all titanium is present as normal tetravalent titanium disulphate, Ti(SO₄)₂.

We have found it is possible to bring about high titanium extraction from residues of the type described and to effect ultimate recovery of titanium as crystalloidal basic titanium sulphate solution by subjecting the residues to sulphuric acid and heat treatments. More particularly, we have discovered these objects may be accomplished by incorporating with the residue an amount of sulphuric acid such that the resulting mass contains—over and above the quantity of sulphuric acid needed to satisfy the disulphate requirements of any water soluble titanium which may be present—not less than 1.3 and not more than 1.9 parts by weight of H₂SO₄ (100% basis) to one part by weight of the residue (dry basis), and then heating or baking the resulting mass by extraneous heat at temperatures of 200 to 300° C. for a definite time interval.

In practice of the present improvements as applied to a residue comprising the sludge resulting from a settling operation, the first step is analysis of the material or residue to be treated to determine the solid matter content on dry basis, and also the percent factor of acidity of the liquid associated with the solid material. In the case of sludges resulting from settling operations, the water percentage is relatively high. Since settling vat residue is generally more conveniently workable prior to subsequent incorporation of sulphuric acid, in many instances it will be found preferable to subject the residue to heating in a direct-fired rotary dryer to evaporate off say 20–30% of the water content of the sludge. This procedure reduces evaporation requirements in the later heating stage after incorporation of sulphuric acid.

There is then incorporated with the residue an amount of sulphuric acid such that the resulting mass contains—over and above the quantity of sulphuric acid needed to satisfy the disulphate requirements of any water soluble titanium which may be present—not less than 1.3 and not more than 1.9 parts by weight of H₂SO₄ (100% basis) to one part by weight of the residue (dry basis). In any given situation, the amount of sulphuric acid to be actually added to a residue depends upon the F. A. of the liquid phase of the residue and upon the particular 100% H₂SO₄-dry basis residue ratio (within the limits stated) that experience shows may be most advantageous with respect to the specific operation at hand. The quantity of sulphuric acid required to provide for any chosen 100% H₂SO₄-dry basis residue ratio may be determined by calculation, taking into consideration the dry basis solid matter content of the residue found by analysis mentioned above. Since the sulphuric acid involved in the 100% H₂SO₄-dry basis residue ratio is an amount over and above the sulphuric acid needed to satisfy the disulphate requirements of any water soluble titanium which may be present in the mass, it will be understood that the amount of sulphuric acid obtained by the aforementioned calculation is to be increased or decreased in accordance with whether the percent F. A. of the liquid phase of the residue being handled is less or more than 100%, it being further understood that a titanium sulphate solution of 100% F. A. contains sulphuric acid in amount needed to satisfy the disulphate requirements of any water soluble titanium present in the mass. For example, assuming F. A. of the liquid phase of a particular residue is 75%, the quantity of sulphuric acid actually added to the residue would be the above-mentioned calculated quantity needed to provide for the 100% H₂SO₄-dry basis residue ratio plus whatever sulphuric acid would be required to bring up the F. A. of the liquid phase of the residue from 75 to 100%. Further, assuming F. A. of the liquid phase of another particular residue to be 125%, the quantity of sulphuric acid actually added to the residue would be the above-mentioned calculated quantity needed to provide for the 100% H₂SO₄-dry basis residue ratio minus the quantity of sulphuric acid already in the residue and constituting the difference of F. A. between 100 and 125%. In other words in this situation, the quantity of acid actually added is the calculated quantity lessened by the amount of acid already in the residue above 100% F. A.

We have found that control of the 100% sulphuric acid-dry basis residue ratio, over and above disulphate requirements mentioned, is one of the principal factors in securing commercially satisfactory titanium extraction, and, after baking of the acid-residue mass, ultimate production of crystalloidal basic titanium sulphate solution. We find that if the acid-residue ratio is less than 1.3 there is a not only marked decrease of titanium extraction, but also the titanium sulphate solution produced by dissolution of the baked cake in water is colloidal in spite of the fact that the solution may have such relatively high acidity factor, e. g. 75%, as to indicate stability and the absence of colloidal titanium. On the other hand, the ratio preferably should not exceed 1.9 so that the titanium values of the residue may be recovered as an ultimate water soluble titanium solution which is basic, and hence readily hydrolyzable.

The described mode for determining the quantity of sulphuric acid to be actually added to a residue provides for the rather wide variations of F. A. and of water soluble titanium concentration found in practice in the liquid phase of residues such as sludges of settling operations. It will be understood that in cases where the residue contains no water soluble titanium, the sulphuric acid actually added to the residue is the calculated amount, no provision for presence of water soluble titanium being necessary.

The particular strength of the sulphuric acid incorporated with the residue may be varied considerably, although to reduce evaporation requirements in the subsequent heating operation it is preferred to use strong, e. g. 98% sulphuric acid.

The second stage of the process of the invention comprises heating or baking of the acid-residue mass. Such heating may be effected in any suitable preferably direct-fired furnace, equipped with means for temperature regulation. In the furnace, the residue-sulphuric acid mass is baked by extraneous heating at temperatures of 200 to 300° C. for a time interval sufficient to produce a relatively dry friable mass.

Control of acid-residue ratio and heating temperatures are interdependent in effecting high titanium extraction and formation of a baked cake which when dissolved in water produces a crystalloidal, basic titanium sulfate solution. Assuming proper acid-residue ratio, heating time and temperature are important to avoid making a baked cake which on dissolution in water forms a colloidal titanium sulphate solution notwithstanding satisfactory titanium extraction from the residue. Our investigations show that high titanium recovery is in a large measure dependent upon the high 200–300° C. temperatures coupled with a sufficiently long heating interval, and that over-heating with regard to either temperature or time causes conversion of some of the furnace mass to such condition that when dissolved in water to recover the water soluble titanium sulphate, colloidal titanium compounds are present, thus defeating the objects of the invention. Broadly, heating time is limited so that when the baked furnace cake is dissolved in water a crystalloidal titanium sulphate solution is obtained. Under different operating conditions, time of heating may vary. However, in all cases heating is continued for an interval sufficient to produce a relatively dry friable mass, which endpoint is readily determinable. When a low acidity factor digestion mass is desired, heating may be continued but not beyond the point at which evolution of visible fumes from the mass substantially ceases. On the basis of our work involving treatment of several different residues, heating time of the order of 3 to 7 hours but long enough to produce a relatively dry friable mass is satisfactory.

Following heating, the baked cake is crushed, dissolved in water and metallic iron added to reduce any ferric iron to ferrous. The resulting suspension is then settled or filtered to recover basic titanium sulphate solution. Dissolution of furnace cake in water, treatment with metallic iron, and separation of titanium sulphate solution from contained solid material are generally comparable with the known similar steps for recovering clarified titanium sulphate solution from crude titanium sulphate digester cake resulting from known digestion of raw ilmenite ore and sulphuric acid. However, the baked cake of this invention has a higher insoluble matter content than ordinary ilmenite-sulphuric acid digester cake. This fact will be taken into consideration by the operator in determining the amount of water needed to dissolve the baked cake and to form a settlable or filterable titanium sulphate solution.

In the following Example 1 of practice of the invention, 84.4 kg. of settled residue slurry, containing 15.45 kg. of solids of 60% $TiO_2$ (9.27 kg.) and 2.88 kg. of $TiO_2$ in associated liquor of 100% acidity factor, were mixed with 22 kg. of 98% sulphuric acid. In this instance the weight ratio of 100% $H_2SO_4$ to dry residue was 1.40 to one. The acid-residue mass was heated at 250–300° C. for 6 hours producing 51.25 kg. of dry porous friable cake which was crushed to about 10 mesh. The crushed cake was dissolved in 87 kg. of water, 1.93 kg. of metallic iron being added to reduce ferric iron to the ferrous state. Dissolution was effected in a lead-lined mechanical agitated tank, temperature being held at 50–60° C. by means of steam coils. At the end of six hours dissolution was complete, and the resulting crude titanium sulphate liquor, constituting 97 liters, analyzed Total $TiO_2$ _____ 117.5 g. p. l.
Reduced $TiO_2$ _____ 0.8
Total Fe _____ 75.5
Total $H_2SO_4$ _____ 321.0
Free $H_2SO_4$ _____ 44.4
Active $H_2SO_4$ _____ 183.5
Per cent factor of acidity _____ 30.8%
Suspended residue____ 28.51 g. p. l. at 58.1% $TiO_2$
Sp. gr. _____ 1.4 at 60° C.

This represents an 87.6% recovery of titanium contained in the residue-acid mass charged into the furnace.

In following Example 2, eight liters of slurry, of analysis shown in column A below and weights under B, were mixed with 1.76 liters (3.24 kg.) 95% $H_2SO_4$. Total charge is given under C. The mass was then heated in an electrically heated oven for a period of 5 hours at 200–240° C. to produce a dry, friable cake which was crushed to approximately 10 mesh. 1.8 kg. of redigested cake was dissolved with 2 kg. $H_2O$ and .035 kg. metallic iron added during dissolution to reduce ferric salts. The resulting crystalloidal liquor analyzed as shown under D. 90.2% of the total $TiO_2$ of the redigested cake was rendered soluble by the treatment, and was present in the final solution.

|  | A Original residue | B (8 liters) (11.24 kg.) | C Total charge | D Soln. from redigested cake |
|---|---|---|---|---|
| Sp. gr. | 1.40 |  |  | 1.560 |
| Residue, g. p. l. | 247 | 1.976 kg. | 1.976 kg. | 31.24 |
| Residue, percent | 17.6 |  |  |  |
| Percent $TiO_2$ | 60 |  |  | 58.40 |
| Solution $TTiO_2$, g. p. l. | 48.2 |  |  | 171.1 |
| $TFe$ | 35.9 |  |  | 96.7 |
| $TH_2SO_4$ | 214.7 |  |  | 464 |
| $FH_2SO_4$ | 92.7 | 0.682 kg. | 3.762 kg. |  |
| Percent F. A. | 157 |  |  | 40.6 |
| Percent total $TiO_2$ soluble | 22.9 |  |  | 90.2 |

In this example, the 100% $H_2SO_4$-dry basis residue ratio used, over and above the quantity of sulphuric acid needed to satisfy the disulphate requirements of the water soluble titanium present, was 1.69:1. It is noted the F. A. of the liquid phase of the residue was 157%. Hence, the amount of 100% $H_2SO_4$ actually added to the residue, to provide the just stated ratio of 1.69:1, was .247 kg. less than would have been actually added if the F. A. of the liquid phase had been less, e. g. 100%.

In another instance of practice of the invention, one kilogram of settled residue sludge, containing 311 grams of solids per liter (21.7% dry solids by weight), was mixed with 98% sulphuric acid in amount such that the mass had, over and above the sulphuric acid needed to satisfy the disulphate requirements of water soluble titanium present, a 100% sulphuric acid to dry solids ratio of 1.3 to one. The mixed charge was baked for four hours at 200–250° C. and the resulting cake leached with water. 91.3% of the total $TiO_2$ of the mass charged into the furnace was recovered as a titanium sulphate solution having an acidity factor of 24%.

Although the acidity factor of above product solutions is low, the solutions were crystalloidal as shown by the previously indicated HCl dilution test.

In addition to recovery of titanium values from residues of the types described, the invention affords the further advantage of recovery of relatively large amounts of sulphuric acid normally contained in these residues and by previous usual practice disposed of as waste along with the titaniferous solid constituents of the residues.

We claim:

1. The method for recovering and converting to water soluble form, water insoluble titanium values of residue resulting from (1) formation of a titanium sulphate solution containing titanium material which has remained undissolved by a previous sulphuric acid attack on said material, and (2) subsequent separation of the major part of the titanium sulphate solution from at least the bulk of the said material which method comprises incorporating with the residue an amount of sulphuric acid such that the resulting mass contains—over and above the quantity of sulphuric acid needed to satisfy the disulphate requirements of any water soluble titanium present—not less than 1.3 and not more than 1.9 parts by weight of $H_2SO_4$ (100% basis) to one part by weight of residue (dry basis), and heating the mass by extraneous heat at temperatures of 200 to 300° C. for a time interval, not less than about 3 hours, long enough to produce a relatively dry friable mass but not beyond the point at which evolution of visible fumes from the mass substantially ceases, to thereby form a mass of low acidity factor, treating said mass with water to dissolve water soluble titanium sulphate, and separating solid residue from the resulting crystalloidal basic titanium sulphate solution.

2. The method for recovering and converting to water soluble form, water insoluble titanium values of residue resulting from (1) formation of a titanium sulphate solution containing titanium material which has remained undissolved by a previous sulphuric acid attack on said material, and (2) subsequent separation of the major part of the titanium sulphate solution from at least the bulk of the said material which method comprises incorporating with the residue an amount of sulphuric acid such that the resulting mass contains—over and above the quantity of sulphuric acid needed to satisfy the disulphate requirements of any water soluble titanium present—not less than 1.3 and not more than 1.9 parts of weight of $H_2SO_4$ (100% basis) to one part by weight of residue (dry basis), and heating the mass by extraneous heat at temperatures of 200 to 300° C. for a time interval of the order of 3 to 7 hours to produce a relatively dry friable mass, treating said mass with water to dissolve water soluble titanium sulphate, and separating solid residue from the resulting crystalloidal basic titanium sulphate solution.

L'ROCHE G. BOUSQUET.
MAXWELL J. BROOKS.